United States Patent [19]

Zezinka et al.

[11] Patent Number: 5,300,326
[45] Date of Patent: Apr. 5, 1994

[54] METHOD OF COATING A PLASTIC SUBSTRATE WITH AN AQUEOUS COATING COMPOSITION FOR PLASTIC SUBSTRATES

[75] Inventors: Edward W. Zezinka, Allison Park, Pa.; Susan K. Vicha, Cleveland, Ohio; Charles M. Kania, Natrona Heights, Pa.

[73] Assignee: PPG Industries, Inc., Pittsburgh, Pa.

[21] Appl. No.: 103,386

[22] Filed: Aug. 9, 1993

Related U.S. Application Data

[62] Division of Ser. No. 8,110, Jan. 22, 1993, Pat. No. 5,258,444.

[51] Int. Cl.$^5$ .................. B32B 27/08; B32B 27/32; B32B 27/40
[52] U.S. Cl. .................................................. 427/385.5
[58] Field of Search ..................................... 427/385.5

[56] References Cited

U.S. PATENT DOCUMENTS

| | | | |
|---|---|---|---|
| 4,622,685 | 4/1989 | Perez et al. ............. | 428/423.3 |
| 4,997,882 | 3/1991 | Martz et al. ............ | 525/65 |

FOREIGN PATENT DOCUMENTS

| | | | |
|---|---|---|---|
| 3942362 | 8/1990 | Fed. Rep. of Germany ... | 427/385.5 |
| 0104137 | 6/1985 | Japan ................... | 427/385.5 |
| 261476 | 10/1989 | Japan . | |
| 18470 | 1/1992 | Japan . | |

OTHER PUBLICATIONS

Dr. F. Fujimoto, "Properties and Applications of Chlorinated Polypropylene", Paint & Resins, Feb. 1986, pp. 36–40.

Rohm & Haas Co., Product Information Brochure, "Rhoplex® WL-51 Waterborne Polymer for Industrial Lacquers", Polymers, Resins and Monomers, 1986, pp. 1-15.

S. B. Fry, P. J. Greene, D. W. Magouyrk, K. Middleton, E. J. Sacksteder, "Develop. of A New Adhesion Promoter for Coating Thermoplastic Polyolefin", Polymers Paint Colour Journal, vol. 180 No. 4274, Dec. 1990, pp. 732,733,764.

Robert D. Cody, American Cyanamid, "Chemistry and Applications of TMXDI® I(META) Aliphatic Isocyanate" presented at U-Tech 88, The Hague, Oct. 1988, pp. 1–24.

American Cyanamid Product Brochure entitled "Aqueous Polyurethane Dispersions from TMXDI® (META) Aliphatic Isocyanate", pp. 1-4.

American Cyanamid Product Brochure entitled "Properties of Acrylic Latexes with TMI® (META) Unsaturated Isocyanate", pp. 1-3.

Toyo Kasei Kogyo Co., Ltd., Hardlen Product Brochure, no date available.

*Primary Examiner*—Paul R. Michl
*Assistant Examiner*—Peter Szekely
*Attorney, Agent, or Firm*—Linda Pingitore

[57] ABSTRACT

A method of coating plastic substrates involves applying an aqueous coating composition to the surface of a plastic substrate and allowing the coating composition to dry and form a film. The coating composition contains an aqueous polyolefin dispersion and an aqueous polyurethane dispersion.

25 Claims, No Drawings

METHOD OF COATING A PLASTIC SUBSTRATE WITH AN AQUEOUS COATING COMPOSITION FOR PLASTIC SUBSTRATES

This is a divisional of application Ser. No. 08/008,110, filed Jan. 22, 1993 U.S. Pat. No. 5,258,444.

BACKGROUND OF THE INVENTION

The present invention relates to aqueous coating compositions and to their use for coating plastic substrates. More specifically, the present invention relates to aqueous coating compositions that contain chlorinated polyolefin dispersions and polyurethane dispersions. These coating compositions produce dried films which adhere well to plastic substrates while maintaining good application properties over a broad range of application conditions.

Plastic substrates are widely used in automotive parts, container caps and containers for cosmetics, household appliances and other applications. Organic coating compositions are often applied to such plastic substrates for decorative and protective purposes. An ongoing problem with respect to such use of these substrates has been the difficulty in achieving adequate adhesion of organic films to the plastic, especially after the film has been aged or exposed to environmental stress.

Complicating the problem is the fact that there are many different types of plastics used commercially, each having unique surface properties. It would be advantageous if one product could be used to coat a variety of substrates that might vary widely in properties such as surface tension, surface roughness, chemical composition, and hardness.

In automotive applications such as the formulation of automotive refinish compositions, there are other requirements besides adhesion that must be met: for example, there are requirements for compatibility with other coating compositions which can be applied over the coating in question; for stability upon long-term storage or upon exposure to shear; for room-temperature cure; for a high degree of resistance of the dried film to solvents, fuels, acids and other chemicals; for a high degree of resistance of the dried film to humidity; for excellent appearance; and for low cost.

A wide range of approaches has been proposed to overcome the adhesion problem. Perhaps the most viable has been the application of a primer composition that contains an aqueous chlorinated polyolefin dispersion and an aqueous acrylic dispersion. While this is a low-cost material, it provides only fair adhesion, showing weaknesses especially after exposure to humidity. Even with this material, it is still difficult to economically produce dried films with excellent adhesion, application properties and physical properties.

SUMMARY OF THE INVENTION

In accordance with the present invention, there is provided a method of coating plastic substrates with an aqueous coating composition comprising an aqueous chlorinated polyolefin dispersion and an aqueous polyurethane dispersion. Also provided is a coated plastic article prepared by the method.

DETAILED DESCRIPTION

The coating compositions of the present invention contain as essential components an aqueous chlorinated polyolefin dispersion and an aqueous polyurethane dispersion, both of which are described in detail below. The claimed coating compositions are advantageous in a variety of applications where adhesion to a plastic substrate is required, particularly in automotive coating applications such as refinishing processes. The coating compositions produce films which exhibit excellent adhesion to plastics, maintain good application properties over a broad range of application conditions, and exhibit excellent physical and chemical properties such as ambient temperature cure, chemical and solvent resistance, humidity resistance and package stability upon long term storage.

As used herein, the term "plastic" is intended to include any of the thermoplastic or thermosetting synthetic nonconductive materials commonly used in injection or reaction molding, sheet molding or other similar processes whereby parts are formed.

Chlorinated polyolefin dispersions and aqueous polyurethane dispersions are well known in the art and are available commercially. Chlorinated polyolefin dispersions can be prepared by adding ionic and/or nonionic emulsifiers to chlorinated polyolefin resins so that they can be dispersed in water.

Polyolefin resins can be produced by ionic polymerization or Ziegler-Natta polymerization according to well-known techniques as reviewed, for example, in Billmeyer, "Textbook of Polymer Science," p. 311–325, Wiley-Interscience, New York, N.Y., 1962. Polyolefin resins which can be used to produce chlorinated polyolefin resins include, for example, polyethylene, polypropylene, polybutylene, polyisoprene, polybutadiene and mixtures thereof. Polypropylene or mixtures of polyolefins containing polypropylene are preferred because they provide optimum adhesion to plastic substrates.

The crystallinity of the polyolefin can be adjusted to affect coating composition properties. This can be done by choosing a specific stereoisomer of the polymer. Isotactic polymers (in which all side groups are arranged on one side of the polymer backbone), syndiotactic polymers (in which side groups are arranged alternately above and below the plane of the polymer backbone), or atactic polymers (in which side groups are arranged randomly about the plane of the polymer backbone) can be used to prepare the chlorinated polyolefin dispersions of the present invention. Isotactic stereoisomers are preferred because of the excellent chemical resistance and strength they provide and because of the relative ease with which they are produced.

The crystallinity of the polyolefin can also be adjusted by varying the amount of chlorine in the backbone. Generally, as the chlorine content rises, the crystallinity of the polymer decreases and the solubility of the polymer in various solvents, including water, increases.

Co-block polymers of polyolefins and acrylics, for example styrene or acrylonitrile, can also be used to prepare chlorinated polyolefin resins; alternately, co-block polymers of polyolefins and anhydrides, for example maleic anhydride, can be used.

Although not necessary, a solvent is sometimes used in preparing the polyolefin resin to reduce the viscosity of the product. Such solvents include, for example, aliphatic hydrocarbons such as hexane or heptane; aromatic hydrocarbons such as cyclohexane, toluene, or xylene; alcohols such as isopropanol, butanol, 2-ethylhexanol or propylene glycol; ethers such as the monoethyl, monobutyl or monohexyl esters of ethylene glycol or diethylene glycol; esters such as butyl acetate, ethyl acetate, 2-ethylhexyl acetate, or ethyl-3-ethoxy propionate; and ketones such as isophorone, 4-methoxypentanone, diisobutyl ketone, or methyl isobutyl ketone; and the like. The preferred solvent is xylene. When solvent is used, the amount of solvent generally ranges from about 20 percent to about 80 percent by weight, preferably from about 50 percent to about 70 percent by weight, the percentages based on the weight of the polyolefin.

Polyolefin resins can be chlorinated by solution, melt or solid polymer chlorination at moderate to high temperatures according to well-known techniques as reviewed, for example, in Raff and Doak, "Crystalline Olefin Polymers II," p. 239-260, Interscience Publishers, New York, N.Y., 1964. For example, a suitable chlorinated polyolefin resin can be prepared by bubbling chlorine gas through a hot solution of polyolefin in benzyl chloride, or by irradiating a solution of polyolefin in carbon tetrachloride with ultraviolet light. A chlorinated polyolefin resin so obtained is then dispersed in water to produce a chlorinated polyolefin dispersion which is used in the coating composition of the present invention. Preferably, the chlorinated polyolefin resin is stripped of solvent before it is dispersed in water.

Typically, the chlorinated polyolefin resins to be dispersed have a weight-average molecular weight from about 10,000 to about 100,000 as determined by gel permeation chromatography using a polystyrene standard; however, frequently the chlorinated polyolefin dispersion contents less than 25 percent by weight of very high molecular weight material, that is, material with a weight-average molecular weight well above 100,000. Chlorinated polyolefin resins with a weight-average molecular weight from about 25,000 to about 75,000 are preferred because they provide an optimum combination of coating properties, for example the coating viscosity/solids relationship, flexibility and adhesion to plastic substrates.

Chlorinated polyolefin resins can be unstable and dechlorinate upon irradiation or exposure to elevated temperatures. Consequently, the exact chlorine level of a chlorinated polyolefin resin can vary over time or from batch to batch. Typically, the chlorinated polyolefin resins used to prepare the chlorinated polyolefin dispersions of the present invention contain from about 0.50 percent to about 60 percent chlorine, the percentages based on the weight of polyolefinic material present. Preferably, the chlorine content is from about 10 percent to about 50 percent, more preferably from about 20 percent to about 35 percent by weight. This level of chlorination is preferred because it provides an optimum combination of adhesion, drying speed and coating viscosity. The chlorine is randomly present on the polyolefinic backbone.

As mentioned above, chlorinated polyolefin resins are subject to dechlorination. The dechlorination reation produces hydrochloric acid. Although not necessary, a scavenger can be used to remove the hydrochloric acid. Examples of materials which can be used as scavengers include organic metal compounds such as dibutyl tin dilaurate, stannous octoate or dibutyl tin oxide; or epoxy resins such as epoxidized linseed oil, or, preferably, polyglycidyl ethers of polyphenols such as BISPHENOL A, which is commerically available from Shell Corporation. The most preferred scavenger is the diglycidyl ether of BISPHENOL A, commerically available from Shell Corporation as EPON 828.

Chlorinated polyolefin resins suitable for preparing the chlorinated polyolefin dispersions of the present invention are available commercially. These materials are often made from a mixture of polyolefinic raw materials which are the by-products of other chemical processes. As such, the exact composition of the polyolefinic backbone of the commercial materials can vary from batch to batch. The preferred chlorinated polyolefin resin for preparation of the chlorinated polyolefin dispersion of the present invention is available from Eastman Chemical International Ltd. as CP-343-3, prepared as a 50% solution by weight in xylene. This product is based on a mixture of polyolefinic raw materials, and has a chlorine content of about 18% based on the weight of the polyolefininc materials present.

Emulsifiers which can be used to disperse the chlorinated polyolefins can be ionic, non-ionic, or mixtures thereof. Typical ionic emulsifiers can be anionic, including amine or alkali salts of carboxylic, sulfamic or phosphoric acids, for example sodium lauryl sulfate, ammonium lauryl sulfate, oleic acid and 2-amino-2-methyl propanol; cationic, including acid salts of amines such as laurylamine hydrochloride; or amphoteric, that is, compounds bearing both anionic and cationic groups, for example lauryl betaine; dihydroxy ethylalkyl betaine; amido betaine based on coconut acids; disodium N-lauryl amino propionate; or the sodium salts of dicarboxylic acid coconut derivatives. Typical non-ionic emulsifiers include ethoxylated or propoxylated alkyl or aryl phenolic compounds such as octylphenoxypolyethyleneoxyethanol. The preferred emulsifier is a mixture of oleic acid and 2-amino-2-methyl propanol.

Aqueous polyurethane dispersions suitable for use in the present invention are typically at least partially neutralized, and can be prepared from a polyurethane prepolymer which in turn, is prepared by reacting a polyol with a polyisocyanate-containing component. The polyol provides a source of hydroxyl groups, and also a source of ionic salt groups that are subsequently neutralized so that the prepolymer can be dispersed into water. Polyols with a weight-average molecular weight from about 500 to about 2000 as determined by gel permeation chromatography using a polystyrene standard are preferred.

The polyol is preferably a difunctional polyol, or diol. Specific examples include alkylene polyols such as ethylene glycol, 1,4-butanediol and neopentyl glycol; linear polyether polyols such as poly(oxytetramethylene)glycol and poly(oxyethylene)glycol; polyester diols such as polycaprolactone diol; and mixtures of the above. Polyols with functionality greater than two can also be used, including, for example, glycerol, trimethylolethane, trimethylolpropane, pentaerythritol, and poly(oxyethylene) and poly(oxypropylene) derivatives of triols and tetrols. Besides polyester polyols prepared from polybasic acids and polyols, polycaprolactone-type polyesters can also be employed. These products are formed from the reaction of a cyclic lactone such as epsilon-caprolactone with a polyol such as ethylene glycol, diethylene glycol, trimethylolpropane or dimethylolpropionic acid, including mixtures thereof. Such products are described in U.S. Pat. No. 3,169,945 to Hostettler.

The acid component of the polyester consists primarily of monomeric carboxylic acids or anhydrides. The acid can be acylic or cyclic, including cycloaliphatic and aromatic polycarboxylic acids. Among the acids which can be used are phthalic acid, tetrahydrophthalic acid, hexahydrophthalic acid, adipic acid and maleic acid, including mixtures thereof. The corresponding acid anhydrides, where they exist, can be used in place of the acids. Also, lower alkyl esters such as dimethyl esters of these acids can be used.

Preferably, the polyol is prepared from a dicarboxylic acid and a diol, more preferably, the dicarboxylic acid is adipic acid and the diol is hexanediol. Such material is commercially available from Witco Chemical Company as FORMREZ 66-112.

The ionic salt groups on the polyol can be cationic, for example amine groups, ammonium groups or sulfonium groups; or they can be anionic, for example sulfuric, sulfurous, phosphoric, phosphorous or carboxylic acid groups. Anionic salt groups, specifically carboxylic acid groups, are preferred.

Alternately, a polyol which does not contain ionic salt groups can be used, and a separate source of ionic salt groups can be added during the polymerization of the polyurethane prepolymer. The separate sources of ionic salt groups can be cationic, including for example, amines such as triethyl amine, dimethylethanolamine and diisopropanolamine; or, preferably, they can be anionic, including for example, compounds which contain active hydrogen groups and acid groups. Examples of such compounds are hydroxy carboxylic acids, mercapto carboxylic acids, amino carboxylic acids, amino hydroxy carboxylic acids, sulfonic acids, hydroxy sulfonic acids and amino sulfonic acids. Specific examples include sulfamic acid, lactic acid, glycolic acid, oxaluric acid, anilido acetic acid, glycine, 6-amino-caprylic acid, 2-hydroxyethane sulfonic acid, hydroxyethylpropionic acid, and sulfanilic acid. The amino acids should be used in the presence of a tertiary amine or a base such as potassium hydroxide. Preferably, the polyurethane prepolymer is prepared with 2,2-dimethylolpropionic acid added during the polymerization as a separate source of ionic salt groups.

The polyisocyanate-containing component used to make the polyurethane prepolymer can contain aliphatic, cycloaliphatic or aromatic polyisocyanates, or mixtures thereof, with aliphatic polyisocyanates being preferred. Diisocyanates are preferred, although higher polyisocyanates such as triisocyanates can be used either in place of or in combination with diisocyanates. Examples of the aliphatic diisocyanates are trimethylene, tetramethylene, tetramethylxylylene, pentamethylene, hexamethylene, 1,2-propylene, 1,2-butylene, 2,3-butylene, and 1,3-butylene diisocyanates. Also suitable are cycloalkylene compounds such as 1,3-cyclopentane and isophorone diisocyanates; aromatic compounds such as m-phenylene, p-phenylene and diphenylmethane-4,4-diisocyanate; aliphatic-aromatic compounds such as 2,4- or 2,6-tolylene diisocyanates and 1,4-xylylene diisocyanate; nuclear-substituted aromatic compounds such as dianisidine diisocyanate and 4,4-diphenylether diisocyanate; triisocyanates such as triphenylmethane-4,4,4-triisocyanate, and 1,3,5-triisocyanatobenzene; tetraisocyanates such as 4,4-dimethyldiphenylmethane-2,2,5,5-tetraisocyanate; polymerized polyisocyanates such as tolylene diisocyanate dimers and trimers; and the like. Isothiocyanates corresponding to the above described isocyanates, where they exist, can be employed as well as mixtures of materials containing both isocyanate and isothiocyanate groups. Preferably, the isocyanate is meta-tetramethylxylylene diisocyanate.

Optionally, a catalyst for urethane formation can be employed in the reaction of the polyol and polyisocyanate-containing component. Examples of catalysts include tertiary amines and organic tin compounds such as dibutyltin dioctoate, dibutyltin oxide and dibutyltin diacetate. The preferred catalyst is dibutyltin dilaurate.

The polyurethane prepolymer is at least partly neutralized with ionic groups and dispersed in water to form the aqueous polyurethane dispersions of the present invention. Prepolymers made from polyols containing cationic groups are neutralized with anionic neutralizing agents and prepolymers made from polyols containing anionic groups are neutralized with cationic neutralizing agents. Specific examples of anionic neutralizing agents include acids such as sulfamic acid, lactic acid, glycolic acid and the like. Examples of cationic neutralizing agents include amines such as triethylamine and diisopropanolamine. The preferred neutralizing agent is dimethylethanolamine. The neutralizing agent can be added to the prepolymer before the prepolymer is added to the aqueous phase, or, alternately and preferably, the neutralizing agent can be present in the aqueous phase when the prepolymer is added to it.

Other methods of dispersing the polyurethane prepolymer into water are detailed in Dieterich, "Aqueous Emulsions, Dispersions and Solutions of Polyurethane, Synthesis and Properties," Progress in Organic Coatings, 9(1981) p. 281–340, copyright Elsevier Sequiod S.A., Lausanne.

The polyurethane prepolymer is generally chain-extended to obtain a material having a weight-average molecular weight from about 1000 to about 10,000 as determined by gel permeation chromatography with a polystyrene standard. Most preferred are polyurethanes with a weight-average molecular weight from about 1000 to about 2000. Examples of suitable materials for chain extension are diamines having primary and/or secondary amino groups, including hydrazine, substituted hydrazine and hydrazine reaction products; various alkanolamines such as diethanolamine; alkylene diamines such as ethylene diamine, propylene diamine and hexamethylene diamine; branched polyamines such as tetraethylene pentamine, triethylene tetraamine, diethylene triamine, tris(2-aminoethyl)amine and various polyoxyalkylene amines which are commercially available from Texaco under the trademark JEFFAMINE. The preferred materials to be used for chain-extension are the polyamines, specifically 2-methylpentamethylenediamine. Preferably, reaction of the prepolymer with polyamine is accomplished during dispersion by having the polyamine present in the aqueous phase; alternatively, the polyamine can be added directly to the prepolymer before dispersion.

The chlorinated polyolefin dispersion is generally present in the claimed coating compositions in an amount ranging from about 1% to about 40% by weight of the composition and the aqueous polyurethane dispersion is present in an amount from about 60% to about 99% by weight of the composition, the percentages based on the total weight of resin solids of the composition. Preferably, the amount of chlorinated polyolefin dispersion ranges from about 5% to about 15% by weight of the composition and the amount of aqueous polyurethane dispersion ranges from about 85% to about 95% by weight of the composition.

The coating compositions of the present invention usually also contain pigments and, if desired, various additives such as surfactants or wetting agents. The pigments can be of the conventional types comprising fillers, flatteners and colorants such as iron oxides, lead oxides, strontium chromate, carbon black, coal dust, titanium dioxide, talc, barium sulfate, cadmium yellow, cadmium red, chromium yellow and the like. The pigment content of the dispersion is usually expressed as a pigment-to-resin ratio. In the present invention, the pigment-to-resin ratio is usually from about 0.02:1.0 to about 5.0:1.0. The amounts of the other additives mentioned above can vary widely, but are usually in the composition in amounts from about 0.01 percent to about 3.0 percent by weight based on the weight of total resin solids present.

The coating compositions of the present invention can be applied to various substrates including wood, metals, glass, cloth, plastic, foam and elastomeric substrates. They are particularly useful when applied to plastic substrates. As previously mentioned, the term "plastic" is meant to include any of the common thermoplastic or thermosetting synthetic nonconductive materials, for example polyethylene, polypropylene, thermoplastic urethane, thermoplastic olefin, polycarbonate, sheet molding compound, reaction-injection molding compound, acrylonitrile-based materials, nylon and the like. The compositions can be applied by conventional means including brushing, dipping, flow coating, spraying and the like, but preferably they are applied by spraying according to the usual spray techniques and equipment for air spraying as used by those skilled in the art of coating application. Electrostatic spraying can also be used provided the plastic substrate is first made electroconductive. This can be done, for example, by first coating it with an electroconductive primer coating. The coating compositions of the present invention can themselves be made electroconductive by, for example, including an electroconductive pigment in the pigment composition, thus allowing electrostatic spraying of subsequently applied topcoat systems onto the primed plastic substrate.

Proper surface preparation is generally important to obtain good final film properties. Depending on the particular type of application, the substrate may or may not be sanded. For automotive refinish applications, typically the substrate to be coated is first scuff-sanded with an abrasive material, for example, fine steel wool or sandpaper. Typically, also, for most applications, the substrate is cleaned with a cleaning solvent, for example an alcohol such as methanol or ethanol; a hydrocarbon such as naphtha or mineral spirits; or a ketone such as methyl isobutyl ketone or acetone; and the like.

The coating composition of the present invention is then applied to the substrate to a uniform thickness from about 0.25 mils to about 5.0 mils, preferably from about 0.5 mils to about 1.5 mils. Once the coating composition is applied, film formation can be achieved with gentle heating; preferably, the coating is simply air-dried. The time required for drying will depend on the ambient humidity, but typically, a drying time of from about 1 minute to about 60 minutes is to be expected. The temperature for drying is limited by the deformation temperature of the plastic substrate which is to be coated, typically no higher than about 100 degrees C.

Any number of coating compositions can be applied over the coating composition of the present invention. Typically, the claimed coating composition is used as a primer directly applied to the substrate surface and a pigmented coating composition or a "color+clear" topcoating system is applied over top. When used as a primer, first the coating of the present invention is "flashed," that is, it is left to stand for about 10 seconds to about 30 minutes or longer before another coating composition is applied to it. Then, typically, a pigmented coating composition is applied by air-spray over the coated substrate in one or more coats to a uniform film thickness from about 0.5 mils to about 2.0 mils. Optionally, a clear topcoating composition can be applied over the pigmented coating composition, to form a "color+clear" system. To do this, typically, a substrate which has been coated with both the coating composition of the present invention and a pigmented coating composition is flashed for from about 10 seconds to about 30 minutes or longer before the final clear topcoating composition is applied to it. The clear topcoat composition is usually applied by air-spray to a uniform film thickness from about 1.0 mil to about 5.0 mils. The pigmented coating composition or the "color+clear" system is then cured or dried with gentle heating. Preferably, it is simply air-dried. The temperature for curing or drying is limited by the deformation temperature of the plastic substrate which is to be coated, typically no higher than about 100 degrees C.

Illustrating the invention are the following examples, which are not to be considered as limiting the invention to their details. All parts and percentages in the examples as well as throughout the specification are by weight unless otherwise indicated.

EXAMPLES

The following examples show the formulation of aqueous coating compositions comprising aqueous chlorinated polyolefin dispersions and aqueous polyurethane dispersions which can be used to coat plastic substrates. For the purposes of comparison, an aqueous coating composition comprising an aqueous chlorinated polyolefin dispersion and an aqueous acrylic dispersion was prepared.

Examples A-B show the preparation of tinting pastes used in the coating compositions. Examples I-V show the preparation of various aqueous dispersions used to illustrate the invention, the formulation of aqueous coating compositions which contain the aqueous dispersions, and the use of these compositions in the process of coating plastic substrates to produce coated articles. Example VI is a comparative example showing the formulation of an aqueous coating composition which contains an aqueous polyolefin dispersion and an aqueous acrylic dispersion. Table I shows the results of various physical tests comparing the aqueous coating compositions of Examples I-VI.

EXAMPLE A

Preparation of a Tinting Paste for Examples I-V

A tinting paste was made for use in preparing the coating composition of Examples I-V from the following mixture of ingredients:

| INGREDIENT | GRAMS |
| --- | --- |
| Deionized Water | 240.38 |
| NITROSOL 250 MBR[1] | 2.38 |
| 2-Amino-2-Methyl Propanol | 1.26 |
| NUODEX PMA-18[2] | 0.28 |
| DREWPLUS L-464[3] | 1.96 |

| INGREDIENT | GRAMS |
| --- | --- |
| TAMOL 165[4] | 14.70 |
| AQUABEAD 519[5] | 12.18 |
| Titanium Dioxide | 264.60 |
| TRANSLINK 77[6] | 51.66 |
| Magnesium Silicate | 128.94 |
| Deionized Water | 13.16 |
| ATTAGEL 50[7] | 9.52 |
| BAYFERROX 318M[8] | 9.52 |

[1] Hydroxyethyl cellulose, commercially available from Aqualon Group Inc. at 100% solids.
[2] Phenyl Mercuric Acetate, commercially available from Huls America at 30% solids.
[3] A blend of silica, silicone, wax and mineral oil, commercially available from Drew Chemical Corp. at 100% solids.
[4] An aqueous solution polymer, commercially available from Rohm & Haas Co. at 23% solids.
[5] A synthetic hydrocarbon wax, commercially available from Micro Powders, Inc. at 100% solids.
[6] A calcined kaolin clay extender, commercially available from Engelhard Corp. at 100% solids.
[7] Magnesium aluminum silicate, commercially available from Engelhard Corp. at 100% solids.
[8] Black iron oxide, commercially available from Bayer USA Inc. at 100% solids.

All the ingredients were added to a mixing tank sequentially under agitation with a disperser blade. Dispersive agitation was continued until the mixture reached a Hegman of 5.0. The temperature of the mixture was maintained at 50 degrees C. or less during the entire process.

EXAMPLE B

Preparation of a Tinting Paste for Example VI

A tinting paste was made for use in preparing the coating composition of Example VI from the following mixture of ingredients:

| INGREDIENT | GRAMS |
| --- | --- |
| Deionized Water | 78.091 |
| NITROSOL 250 MBR | 0.930 |
| 2-Amino-2-methyl Propanol | 0.479 |
| PROXEL GXL[1] | 0.119 |
| DREWPLUS L-464 | 0.850 |
| TAMOL 165 | 63089 |
| AQUABEAD 519 | 4.880 |
| Titanium Dioxide | 105.529 |
| TRANSLINK 77 | 20.588 |
| Deionized Water | 26.030 |
| Magnesium Silicate | 51.495 |
| BAYFERROX 318M | 3.790 |
| ATTAGEL 50 | 1.895 |
| JONCRYL 74[2] | 18.569 |
| Deionized Water | 10.444 |

[1] 1,2-benzo-3,1-isothiozoline, commercially available from ICI Americas, Inc. at 24% solids.
[2] A waterborne acrylic polymer, commercially available form S. C. Johnson & Son, Inc. at 49% solids.

All the ingredients were added to a mixing tank sequentially under agitation with a disperser blade. Dispersive agitation was continued until the mixture reached a Hegman of 5.0. The temperature of the mixture was maintained at 50 degrees C. or less during the entire process.

EXAMPLE I

Preparation of an Aqueous Coating Composition Illustrating the Present Invention An aqueous coating composition illustrating the present invention was prepared. The polyurethane dispersion of this coating composition was based on meta-tetramethylxylylene diisocyanate, the chain extender was 2-methylpentamethylene diamine, and the source of ionic groups for dispersion of the polyurethane resin in water was dimethylethanolamine. First, a polyurethane prepolymer was prepared from the following mixture of ingredients:

| INGREDIENT | GRAMS |
| --- | --- |
| FORMREZ 66-112[1] | 415.00 |
| Dimethylolpropionic Acid | 34.37 |
| meta-Tetramethylxylylene Diisocyanate | 270.35 |
| Dibutyltin Dilaurate | 0.29 |

[1] A polyester polyol with a weight-average molecular weight of 1000 prepared from 1,6-hexanediol and adipic acid, commercially available from Witco Corp. at 100% solids.

The FORMREZ 66-112, dimethylolpropionic acid and meta-tetramethylxylylene diisocyanate were charged to a reaction vessel and heated to 70 degrees C. The dibutyltin dilaurate was added and the material was heated to 90 degrees C. until titration with dibutylamine indicated that a constant isocyanate equivalent weight was obtained. At this point, the isocyanate equivalent weight was 882.9 and the acid value was 20.8.

An aqueous polyurethane dispersion was prepared from the prepolymer:

| INGREDIENT | GRAMS |
| --- | --- |
| Deionized Water | 1346.9 |
| Dimethyl Ethanolamine | 20.62 |
| PGNP-15[1] | 4.46 |
| FOAMKILL 649[2] | 3 drops |
| Polyurethane Prepolymer as prepared above | 625.00 |
| DYTEK A[3] | 39.00 |
| Deionized Water | 39.00 |

[1] A surfactant composed of the reaction product of nonylphenol and glycidol, commercially available from Shell Corporation at 70% solids.
[2] A blend of aliphatic hydrocarbons commercially available from Crucible Chemical Co.
[3] A dispersion of 2-methylpentamethylenediamine, commercially available from E. I. du Pont de Nemours & Company Inc. at 95% solids.

The first portion of deionized water, the dimethyl ethanolamine, the PGNP-15 and the FOAMKILL 649 were charged to a reaction vessel and held under agitation at room temperature. The polyurethane prepolymer was gradually added under agitation, holding the temperature at 35 degrees C. The DYTEK A and the final portion of deionized water were added dropwise, and the mixture was held for three hours, during which time the temperature reached 41 degrees C. This produced a resin with a solids content of 32.1% and a pH of 8.70.

An aqueous coating composition was prepared from the polyurethane dispersion and the following mixture of ingredients:

| INGREDIENT | GRAMS |
| --- | --- |
| Polyurethane Dispersion as prepared above | 129.19 |
| ACRYSOL RM-825[1] | 0.70 |
| ACRYSOL RM-1020[2] | 0.47 |
| CP-343-3[3] | 40.71 |
| DEE FO 97-3[4] | 0.29 |

| INGREDIENT | GRAMS |
| --- | --- |
| Tint Dispersion of Example A | 59.04 |

[1] An aqueous polyurethane dispersion commercially available from Rohm & Haas Co. at 25% solids.
[2] An aqueous polyurethane dispersion commercially available from Rohm & Haas Co. at 20% solids.
[3] A chlorinated polyolefin resin commercially available from Eastman Chemical International Ltd. as a 50% solution in xylene, with a chlorine content of about 28%.
[4] A surfactant, commercially available from Ultra Additives Incorporated at 100% solids.

All the ingredients were added to a mixing tank sequentially under agitation.

The coating composition prepared above was spray-applied over polypropylene (PP), reinforced injection molding (RIM) and thermoplastic olefin substrates (TPO) measuring 2 inches × 3 inches (5.08 in × 7.62 cm). Half of the area of each substrate was lightly wiped with a 3M SCOTCH-BRITE coarse abrasive wipe, then the entire substrate was wiped with isopropanol. After spray application, the coating composition was allowed to dry for 95–100 minutes, then the coated substrates were topcoated with a sprayable pigmented topcoating composition, commercially available from PPG Industries, Inc. as DELTRON DAU-9300. After the topcoating composition was applied, the substrates were dried for 24 hours, then tested for adhesion under various conditions. Results are shown in Table I.

EXAMPLE II

Preparation of an Aqueous Coating Composition Illustrating the Present Invention An aqueous coating composition illustrating the present invention was prepared. The polyurethane dispersion of this coating composition was based on isophorone diisocyanate, the chain extender was 2-methylpentamethylene diamine, and the source of ionic groups for dispersion of the polyurethane resin in water was dimethylethanolamine. First, a polyurethane prepolymer was prepared from the following mixture of ingredients:

| INGREDIENT | GRAMS |
| --- | --- |
| FORMREZ 66-112 | 415.0 |
| Dimethylolpropionic Acid | 34.37 |
| Isophorone Diisocyanate | 111.00 |
| m-Pyrol | 122.76 |
| Dibutyltin Dilaurate | 0.28 |

The FORMREZ 66-112, dimethylolpropionic acid and isophorone diisocyanate were charged to a reaction vessel and heated to 70 degrees C. The dibutyltin dilaurate was added and the material was heated to 80 degrees C. until titration with dibutylamine indicated that a constant isocyanate equivalent weight was obtained. At this point, the isocyanate equivalent weight was 1171.6 and the acid value was 17.1.

An aqueous polyurethane dispersion was prepared from the prepolymer:

| INGREDIENT | GRAMS |
| --- | --- |
| Deionized Water | 1261.5 |
| Dimethyl Ethanolamine | 20.35 |
| Polyurethane Prepolymer as prepared above | 750.00 |
| DYTEK A | 35.27 |
| Deionized Water | 35.30 |

| INGREDIENT | GRAMS |
| --- | --- |
| FOAMKILL 649 | 3 drops |

The first portion of deionized water, and the dimethyl ethanolamine were charged to a reaction vessel and held under agitation at room temperature. The polyurethane prepolymer was gradually added under agitation, holding the temperature at 35 degrees C. The DYTEK A and the final portion of deionized water were added dropwise, and the mixture was held for three hours, during which time the temperature reached 38 degrees C. After the hold, the FOAMKILL 649 was added. This produced a resin with a solids content of 31.6% and a pH of 9.08.

An aqueous coating composition was prepared from the polyurethane dispersion and the following mixture of ingredients:

| INGREDIENT | GRAMS |
| --- | --- |
| Polyurethane Dispersion as prepared above | 131.23 |
| ACRYSOL RM-825 | 0.70 |
| ACRYSOL RM-1020 | 0.47 |
| CP-343-3 | 40.71 |
| DEE FO 97-3 | 0.29 |
| Tint Dispersion of Example A | 59.04 |

All the ingredients were added to a mixing tank sequentially under agitation.

The coating composition prepared above was spray-applied over polypropylene, reinforced injection molding and thermoplastic olefin substrates of dimensions given above. Half of the area of each substrate was lightly wiped with a 3M SCOTCH-BRITE abrasive wipe, then the entire substrate was wiped with isopropanol. After spray application, the coating composition was allowed to dry for 95–100 minutes, then the coated substrates were topcoated with a sprayable pigmented topcoating composition, commercially available from PPG Industries, Inc. as DELTRON DAU-9300. After the topcoating composition was applied, the substrates were dried for 24 hours, then tested for adhesion under various conditions. Results are shown in Table I.

EXAMPLE III

Preparation of an Aqueous Coating Composition Illustrating the Present Invention An aqueous coating composition illustrating the present invention was prepared. The polyurethane dispersion of this coating composition was based on meta-tetramethylxylylene diisocyanate, the chain extender was ethylene diamine, and the source of ionic groups for dispersion of the polyurethane resin in water was dimethylethanolamine.

First, a polyurethane prepolymer was prepared from the following mixture of ingredients:

| INGREDIENT | GRAMS |
| --- | --- |
| FORMREZ 66-112 | 830.00 |
| Dimethylolpropionic Acid | 68.74 |
| meta-Tetramethylxylylene Diisocyanate | 122.00 |
| Dibutyltin Dilaurate | 0.58 |

The FORMREZ 66-112, dimethylolpropionic acid and meta-tetramethylxylylene diisocyanate were charged to a reaction vessel and heated to 70 degrees C. The dibutyltin dilaurate was added and the material was heated to 90 degrees C. until titration with dibutylamine indicated that a constant isocyanate equivalent weight was obtained. At this point, the isocyanate equivalent weight was 825.5 and the acid value was 20.6.

An aqueous polyurethane dispersion was prepared from the prepolymer:

| INGREDIENT | GRAMS |
| --- | --- |
| Deionized Water | 1378.5 |
| Dimethyl Ethanolamine | 21.24 |
| PGNP-15 | 4.64 |
| FOAMKILL 649 | 3 drops |
| Polyurethane Prepolymer as prepared above | 650.00 |
| Ethylene Diamine | 20.52 |
| Deionized Water | 20.50 |

The first portion of deionized water, the dimethyl ethanolamine, the PGNP-15 and the FOAMKILL 649 were charged to a reaction vessel and held under agitation at room temperature. The polyurethane prepolymer was added under agitation, over a period of five minutes, while holding the temperature at 35 degrees C. The ethylene diamine and the final portion of deionized water were mixed together, then added dropwise to the resin. The mixture was held for three hours, during which time the temperature reached 39 degrees C. This produced a resin with a solids content of 32.2% and a pH of 7.84.

An aqueous coating composition was prepared from the polyurethane dispersion and the following mixture of ingredients:

| INGREDIENT | GRAMS |
| --- | --- |
| Polyurethane Dispersion as prepared above | 128.79 |
| ACRYSOL RM-825 | 0.70 |
| ACRYSOL RM-1020 | 0.47 |
| CP-343-3 | 40.71 |
| DEE FO 97-3 | 0.29 |
| Tint Dispersion of Example A | 59.04 |

All the ingredients were added to a mixing tank sequentially under agitation.

The coating composition prepared above was spray-applied over polypropylene, reinforced injection molding and thermoplastic olefin substrates of dimensions given above. Half of the area of each substrate was lightly wiped with a 3M SCOTCH-BRITE abrasive wipe, then the entire substrate was wiped with isopropanol. After spray application, the coating composition was allowed to dry for 95-100 minutes, then the coated substrates were topcoated with a sprayable pigmented topcoating composition, commerically available from PPG Industries, Inc. as DELTRON DAU-9300. After the topcoating composition was applied, the substrates were dried for 24 hours, then tested for adhesion under various conditions. Results are shown in Table I.

EXAMPLE IV

Preparation of an Aqueous Coating Composition Illustrating the Present Invention An aqueous coating composition illustrating the present invention was prepared. The polyurethane dispersion of this coating composition was based on meta-tetramethylxylylene diisocyanate, the chain extender was 2-methylpentamethylene diamine, and the source of ionic groups for dispersion of the polyurethane resin in water was triethylamine.

An aqueous polyurethane dispersion was prepared from the polyurethane prepolymer of Example III:

| INGREDIENT | GRAMS |
| --- | --- |
| Deionized Water | 1396.1 |
| Triethylamine | 24.11 |
| PGNP-15 | 4.64 |
| FOAMKILL 649 | 3 drops |
| Polyurethane Prepolymer of Example III: | 650.00 |
| DYTEK A | 39.68 |
| Deionized Water | 39.7 |

The first portion of deionized water, the triethylamine, the PGNP-15 and the FOAMKILL 649 were charged to a reaction vessel and held under agitation at room temperature. The polyurethane prepolymer was added under agitation, over a period of five minutes, while holding the temperature at 35 degrees C. The DYTEK A and the final portion of deionized water were added dropwise to the resin and the mixture was held for three hours, during which time the temperature reached 38 degrees C. This produced a resin with a solids content of 30.8% and a pH of 7.51.

An aqueous coating composition was prepared from the polyurethane dispersion and the following mixture of ingredients:

| INGREDIENT | GRAMS |
| --- | --- |
| Polyurethane Dispersion as prepared above | 134.64 |
| ACRYSOL RM-825 | 0.70 |
| ACRYSOL RM-1020 | 0.47 |
| CP-343-3 | 40.71 |
| DEE FO 97-3 | 0.29 |
| Tint Dispersion of Example A | 59.04 |

All the ingredients were added to a mixing tank sequentially under agitation.

The coating composition prepared above was spray-applied over polypropylene, reinforced injection molding and thermoplastic olefin substrates of dimensions given above. Half of the area of each substrate was lightly wiped with a 3M SCOTCH-BRITE abrasive wipe, then the entire substrate was wiped with isopropanol. After spray application, the coating composition was allowed to dry for 95-100 minutes, then the coated substrates were topcoated with a sprayable pigmented topcoating composition, commercially available from PPG Industries, Inc. as DELTRON DAU-9300. After the topcoating composition was applied, the substrates were dried for 24 hours, then tested for adhesion under various conditions. Results are shown in Table I.

EXAMPLE V

Preparation of an Aqueous Coating Composition Illustrating the Present Invention An aqueous coating composition illustrating the present invention was prepared. The polyurethane dispersion of this coating composition was based on dicyclohexylmethane-4,4-diisocyanate, the chain extender was 2-methylpentamethylene diamine, and the source of ionic groups for dispersion of the polyurethane resin in water was dimethyl ethanolamine. First, a polyurethane prepolymer was prepared from the following mixture of ingredients:

| INGREDIENT | GRAMS |
|---|---|
| FORMREZ 66-112 | 365.00 |
| Dimethylolpropionic Acid | 47.77 |
| DESMODUR W[1] | 131.00 |
| Dibutyltin Dilaurate | 0.28 |
| m-Pyrol | 122.80 |

[1]Dicyclohexylmethane-4,4-diisocyanate, commercially available from Bayer USA Inc. at 100% solids.

The FORMREZ 66-112, dimethylolpropionic acid, DESMODUR W, and m-pyrol were charged to a reaction vessel and heated to 70 degrees C. The dibutyltin dilaurate was added and the material was heated to 80 degrees C until titration with dibutylamine indicated that a constant isocyanate equivalent weight was obtained. At this point, the isocyanate equivalent weight was 1313.5 and the acid value was 22.6.

An aqueous polyurethane dispersion was prepared from the prepolymer:

| INGREDIENT | GRAMS |
|---|---|
| Deionized Water | 1163.0 |
| Dimethyl ethanolamine | 25.10 |
| PGNP-15 | 4.25 |
| FOAMKILL 649 | 3 drops |
| Polyurethane Prepolymer as prepared above | 700.00 |
| Deionized Water | 430.00 |
| DYTEK A | 29.36 |
| Deionized Water | 29.40 |

The first portion of deionized water, the dimethyl ethanolamine, the PGNP-15 and the FOAMKILL 649 were charged to a reaction vessel and held under agitation at room temperature. The polyurethane prepolymer and the second portion of deionized water was added under agitation, over a period of five minutes, while holding the temperature at 35 degrees C. The DYTEK A and the final portion of deionized water were added dropwise to the resin and the mixture was held for three hours, during which time, the temperature reached 38 degrees C. This produced a resin with a solids content of 26.9% and a pH of 8.14.

An aqueous coating composition was prepared from the polyurethane dispersion and the following mixture of ingredients:

| INGREDIENT | GRAMS |
|---|---|
| Polyurethane Dispersion as prepared above | 154.19 |
| ACRYSOL RM-825 | 0.70 |
| ACRYSOL RM-1020 | 0.47 |
| CP-343-3 | 40.71 |
| DEE FO 97-3 | 0.29 |
| Tint Dispersion of Example A | 59.04 |

All the ingredients were added to a mixing tank sequentially under agitation.

The coating composition prepared above was spray-applied over polypropylene, reinforced injection molding and thermoplastic olefin substrates of dimensions given above. Half of the area of each substrate was lightly wiped with a 3M SCOTCH-BRITE abrasive wipe, then the entire substrate was wiped with isopropanol. After spray application, the coating composition was allowed to dry for 95–100 minutes, then the coated substrates were topcoated with a sprayable pigmented topcoating composition, commercially available from PPG Industries, Inc. as DELTRON DAU-9300. After the topcoating composition was applied, the substrates were dried for 24 hours, then tested for adhesion under various conditions. Results are shown in Table I.

EXAMPLE VI (COMPARATIVE)

Preparation of a Comparative Aqueous Coating Composition

A comparative aqueous coating composition based on an aqueous acrylic dispersion and an aqueous chlorinated polyolefin dispersion was prepared from the following mixture of ingredients:

| INGREDIENT | GRAMS |
|---|---|
| RHOPLEX WL-51[1] | 265.883 |
| Butyl CELLOSOLVE[2] | 35.257 |
| Butyl CARBITOL[3] | 11.159 |
| JONCRYL 74 | 167.113 |
| 12% Ammonium Benzoate | 29.432 |
| DREWPLUS L-464 | 2.539 |
| RHEOLATE 278[4] | 13.299 |
| CP-343-3 | 127.337 |
| Tint dispersion of Example B | 359.210 |

[1]An acrylic copolymer emulsion, commercially available from Rohm & Haas Co. at 41.5% solids.
[2]The monobutyl ether of ethylene glycol, commercially available from Union Carbide Corp.
[3]The monobutyl ether of diethylene glycol, commercially available from Union Carbide Corp.
[4]A urethane associative thickener, commercially available from Rheox Inc. at 25% solids.

All the ingredients were added to a mixing tank sequentially under agitation.

The coating composition prepared above was spray-applied over polypropylene, reinforced injection molding and thermoplastic olefin substrates of dimensions given above. Half of the area of each substrate was lightly wiped with a 3M SCOTCH-BRITE abrasive wipe, then the entire substrate was wiped with isopropanol. After spray application, the coating composition was allowed to dry at room temperature for 95–100 minutes, then the coated substrates were topcoated with a sprayable pigmented topcoating composition, commercially available from PPG Industries, Inc. as DELTRON DAU-9300. After the topcoating composition was applied, the substrates were dried at room temperature for 24 hours, then tested for adhesion under various conditions. Results are shown in Table I.

TABLE I

A Comparison of the Properties of Dried Films Produced by the Compositions of Example I–VI

| COATING COMPOSITION | EXAMPLE I | EXAMPLE II | EXAMPLE III | EXAMPLE IV | EXAMPLE V | EXAMPLE VI (COMPARATIVE) |
|---|---|---|---|---|---|---|
| FILM BUILD OF COATING COMPOSITIONS OF EXAMPLE I–VI (mils) | 0.86 | 0.99 | 1.00 | 0.98 | 1.11 | 1.19 |

TABLE I-continued

A Comparison of the Properties of Dried Films
Produced by the Compositions of Example I-VI

| COATING COMPOSITION | EXAMPLE I | EXAMPLE II | EXAMPLE III | EXAMPLE IV | EXAMPLE V | EXAMPLE VI (COMPARATIVE) |
|---|---|---|---|---|---|---|
| FILM BUILD OF PIGMENTED COATING (mils) | 1.93 | 1.93 | 1.93 | 1.93 | 1.93 | 1.93 |
| ADHESION I[1] | | | | | | |
| RIM | 5 | 5 | 5 | 5 | 2 | 5 |
| PP | 0 | 0 | 0 | 0 | 0 | 0 |
| TPO | 0 | 0 | 0 | 0 | 0 | 0 |
| ADHESION II[2] | | | | | | |
| RIM | 0 | 0 | 4 | 0 | 0 | 4 |
| PP | 4 | 1 | 3 | 4 | 0 | 0 |
| TPO | 2 | 0 | 1 | 4 | 0 | 2 |
| BLISTERING[3] | | | | | | |
| RIM | NONE | SLIGHT | NONE | NONE | MODERATE | NONE |
| PP | NONE | MODERATE | NONE | NONE | MODERATE | EDGES ONLY |
| TPO | NONE | SEVERE | NONE | NONE | SEVERE | SEVERE |
| ADHESION III[4] | | | | | | |
| RIM | 4-5 | 4-5 | 4-5 | 4-5 | 4 | 4 |
| PP | 0-1 | 3 | 0 | 0 | 0 | 0 |
| TPO | 1 | 0 | 3 | 4 | 0 | 1 |

[1]Test panels were aged 24 hours, then scribed through to the substrate with a 10 × 10 scribe tool. An adhesive tape commercially available from Permacel of Nitto Denko Company as PERMACEL 99 was applied over the scribed area with light pressure, then quickly removed. Panels were inspected for delamination and rated according to the following scale:
0: >65% delaminated
1: 36-65% delaminated
2: 16-35% delaminated
3: 6-15% delaminated
4: 1-5% delaminated
5: No delamination

[2]Test panels were aged 24 hours then placed in a humidity chamber that was maintained at 38 degrees C. and 100% relative humidity for 96 hours. Immediately after removal from the humidity chamber, the panels were scribed through to the substrate with a 10 × 10 scribe tool. PERMACEL 99 tape was applied over the scribed area with light pressure, then quickly removed. Panels were inspected for delamination and rated according to the scale noted above.

[3]Test panels were aged 24 hours then placed in a humidity chamber that was maintained at 38 degrees C. and 100% relative humidity for 96 hours. Immediately after removal from the humidity chamber, the panels were inspected visually for blistering according to the following scale:
None: No blistering on a 2 × 3 inch test panel
Slight: 1-10 blisters on a 2 × 3 inch test panel
Moderate: 11-30 blisters on a 2 × 3 inch test panel
Severe: 30 or more blisters on a 2 × 3 inch test panel
Edges only: Any number of blisters occurring only at the edges of a 2 × 3 inch test panel

[4]Test panels were aged 24 hours then placed in a humidity chamber that was maintained at 38 degrees C. and 100% relative humidity for 96 hours. Twenty-four hours after removal from the humidity chamber, the panels were scribed through to the substrate with a 10 × 10 scribe tool. PERMACEL 99 tape was applied over the scribed area with light pressure, than quickly removed. Panels were inspected for delamination and rated according to the scale noted above.

We claim:

1. A method of coating a plastic substrate which comprises:
   (a) applying an aqueous coating composition to the surface of the substrate, wherein the aqueous coating composition comprises an aqueous chlorinated polyolefin dispersion and an aqueous polyurethane dispersion and
   (b) allowing the aqueous coating composition to at least partially dry.

2. The method of claim 1 wherein the plastic substrate is selected from the group consisting of polyethylene, polypropylene, sheet molding compound, thermoplastic urethane, thermoplastic olefin and polycarbonate.

3. The method of claim 1 wherein a pigmented coating composition is applied over the aqueous coating composition to the surface of the substrate.

4. The method of claim 3 wherein a clear topcoating composition is applied over the pigmented composition to the surface of the substrate.

5. A coated substrate prepared according to the method of claim 1.

6. The method of claim 1 wherein the aqueous chlorinated polyolefin dispersion is prepared from a chlorinated polyolefin resin which has a weight-average molecular weight from about 10,000 to about 100,000.

7. The method of claim 6 wherein the chlorinated polyolefin resin has a weight-average molecular weight from about 25,000 to about 75,000.

8. The method of claim 1 wherein the aqueous chlorinated polyolefin dispersion is prepared from a chlorinated polyolefin resin which has a chlorine content from about 0.5% to about 60% based on the weight of the polyolefinic material present.

9. The method of claim 8 wherein the chlorinated polyolefin resin has a chlorine content from about 10% to about 50% based on the weight of the polyolefinic material present.

10. The method of claim 9 wherein the chlorinated polyolefin resin has a chlorine content from about 20% to about 35% based on the weight of the polyolefinic material present.

11. The method of claim 1 wherein the aqueous polyurethane dispersion contains anionic groups.

12. The method of claim 1 wherein the aqueous polyurethane dispersion is prepared from a polyol and a polyisocyanate.

13. The method of claim 12 wherein the weight-average molecular weight of the polyol is from about 500 to about 2000.

14. The method of claim 12 wherein the polyol is a polyester polyol.

15. The method of claim 14 wherein the polyol is a polyester polyol prepared from 1,6-hexanediol, adipic acid and dimethylolpropionic acid.

16. The method of claim 12 wherein the polyisocyanate is an aliphatic polyisocyanate.

17. The method of claim 15 wherein the polyisocyanate is an meta-tetramethylxylylene diisocyanate.

18. The method of claim 11 wherein the aqueous polyurethane dispersion is neutralized with an amine.

19. The method of claim 18 wherein the neutralizing agent for the aqueous polyurethane dispersion is dimethylethanolamine.

20. The method of claim 1 wherein the aqueous polyurethane dispersion is chain-extended with a polyamine.

21. The method of claim 20 wherein the polyamine is 2-methyl pentamethylene diamine.

22. The method of claim 1 wherein the aqueous polyurethane dispersion is prepared from a polyurethane having a weight-average molecular weight of from about 1000 to about 10,000.

23. The method of claim 22 wherein the weight-average molecular weight of the polyurethane is from about 1000 to about 2000.

24. The method of claim 1 wherein the aqueous chlorinated polyolefin dispersion comprises from about 1% to about 40% by weight of the composition and the aqueous polyurethane dispersion comprises from about 60% to about 99% by weight of the composition, the percentages based on the total resin solids of the composition.

25. The method of claim 24 wherein the aqueous chlorinated polyolefin dispersion comprises from about 5% to about 15% by weight of the composition and the aqueous polyurethane dispersion comprises from about 85% to about 95% by weight of the composition, the percentages based on the total resin solids of the composition.

* * * * *